United States Patent [19]

Shimada

[11] Patent Number: 5,038,731

[45] Date of Patent: Aug. 13, 1991

[54] BALANCER SYSTEM FOR INTERNAL COMBUSTION ENGINE

[75] Inventor: Toshio Shimada, Wako, Japan

[73] Assignee: Honda Giken Kogyo Kabushiki Kaisha, Tokyo, Japan

[21] Appl. No.: 550,597

[22] Filed: Jul. 10, 1990

[30] Foreign Application Priority Data

| Jul. 11, 1989 | [JP] | Japan | 1-178226 |
| Jul. 19, 1989 | [JP] | Japan | 1-184457 |
| Aug. 10, 1989 | [JP] | Japan | 1-207560 |
| Aug. 15, 1989 | [JP] | Japan | 1-211164 |

[51] Int. Cl.$^5$ ............................................. F02B 75/06
[52] U.S. Cl. .................................. 123/192 B; 74/603
[58] Field of Search .............. 123/192 B; 74/603, 604

[56] References Cited

U.S. PATENT DOCUMENTS

| 3,401,579 | 9/1968 | Derrig | 74/604 |
| 3,511,110 | 5/1970 | Grieve | 74/604 |
| 4,508,069 | 4/1985 | Dobler et al. | 123/192 B |
| 4,574,749 | 3/1986 | Negre | 123/192 B |
| 4,766,857 | 8/1988 | Lainé et al. | 123/192 B |

FOREIGN PATENT DOCUMENTS

| 2822589 | 11/1979 | Fed. Rep. of Germany . |
| 58-20750 | 2/1983 | Japan . |
| 59-189942 | 12/1984 | Japan . |
| 63-48955 | 4/1988 | Japan . |
| 55-142733 | 3/1989 | Japan . |

OTHER PUBLICATIONS

Patent Abstracts of Japan vol. 7, No. 124 (M-218) (1269) 28 May 1983, & JP-A-58-39863 (Yamaha Hatsudoki KK) 8 Mar. 1983 *whole document*.
Patent Abstracts of Japan vol. 3, No. 39 (M-54) Mar. 31, 1979, & JP-A-54 13806 (Fuji Jukogyo KK) 2 Jan. 1979, *whole document*.
Patent Abstracts of Japan vol. 12 No. 286 (M-727) (3133) 5 Aug. 1988, & JP-A-63 62932 (Yamaha Motor Co. Ltd.) 19 Mar. 1988, *whole document*.

Primary Examiner—Noah P. Kamen
Attorney, Agent, or Firm—Armstrong, Nikaido, Marmelstein, Kubovik, & Murray

[57] ABSTRACT

A balancer system for suppressing vibrations in an internal combustion engine for a motorcycle has pair of balancer shafts, and a pair of first and second primary counterbalances supported on the balancer shafts, respectively, for rotation about axes parallel to the crankshaft of the engine in ganged relation to the crankshaft at the same speed as and in the opposite direction to the crankshaft. The balancer shafts extend parallel to the crankshaft and are positioned one on each side of the crankshaft. The first and second primary counterbalances are rotatable about respective centers which are connected by a line passing through a substantially central portion of the crankshaft, the first and second primary counterbalances being rotatably supported on the balancer shafts near ends thereof, with the centers being spaced from the central portion of the crankshaft by substantially equal distances.

27 Claims, 8 Drawing Sheets

BALANCER SYSTEM FOR INTERNAL COMBUSTION ENGINE

BACKGROUND OF THE INVENTION

The present invention relates to a balancer system for use in an internal combustion engine such as a motorcycle engine or the like.

Some reciprocating internal combustion engines for use on motorcycles incorporate a balancer system to reduce vibrations during the engine operation. Such a balancer system typically comprises a primary counterbalance for reducing primary vibrations, the primary counterbalance being rotatable about an axis parallel to the crankshaft at the same speed as the crankshaft in the opposite direction to the crankshaft, and, if necessary, a secondary counterbalance for reducing secondary vibrations, the secondary counterbalance being rotatable about an axis parallel to the crankshaft at a speed twice that of the crankshaft.

One balancer system which has a pair of primary counterbalances is disclosed in Japanese Laid-Open Utility Model Publication No. 55(1980)-142733. Another balancer system with an additional pair of secondary counterbalances is disclosed in Japanese Laid-Open Utility Model Publication No. 58(1983)-20750.

In the disclosed systems, the primary and secondary counterbalances are supported on respective dedicated balancer shafts which extend parallel to the crankshaft, and rotated about and in unison with the balancer shafts in ganged relation to the crankshaft.

If the centers of gravity of the primary or secondary counterbalances were axially spaced from the axial center of the crankshaft where it is connected to the piston, then a couple of forces would be produced in directions normal to the balancer shaft during rotation of the primary or secondary counterbalances. To avoid the generation of such a couple of forces, the primary or secondary counterbalances are mounted on the balancer shaft at its axial center.

Usually, the counterbalances are supported on the respective balancer shafts in the conventional balancer systems. If there are employed both a pair of primary counterbalances and a pair of secondary counterbalances, therefore, the number of components of the balancer system is large, and the internal combustion engine which incorporates the balancer system is relatively heavy and large in size.

With the primary and secondary counterbalances mounted on the respective balancer shafts, complex mechanisms are required to operatively couple the balancer shafts to the crankshaft for ganged rotation. Use of such complex mechanisms also adds to the number of parts of the balancer system.

Since the counterbalances are mounted on the balancer shafts at their axial centers, it is difficult to install other components such as gears on the axially central regions of the balancer shafts. The balancer shafts are dedicated to the support of the counterbalances, and hence cannot effectively utilized for other purposes. Accordingly, the prior balancer shaft arrangement has presented an obstacle to efforts to reduce the number of parts, weight, and size of the balancer system and hence the engine.

SUMMARY OF THE INVENTION

In view of the aforesaid drawbacks of the conventional balancer systems, it is an object of the present invention to provide a balancer system for an internal combustion engine, which balancer system has a pair of primary counterbalances, is constructed of a reduced number of parts, is small in size, and has components such as a balancer shaft effectively utilized in relation to other mechanisms such as a transmission of the internal combustion engine, so that the internal combustion engine can be reduced in size and weight.

Another object of the present invention is to provide a balancer system for an internal combustion engine, which balancer system has a pair of secondary counterbalances, is constructed of a reduced number of parts, and has components such as a balancer shaft effectively utilized in relation to other mechanisms such as a transmission of the internal combustion engine, so that the internal combustion engine can be reduced in size and weight.

Still another object of the present invention is to provide a balancer system for an internal combustion engine, which balancer system has a pair of primary counterbalances and a pair of secondary counterbalances, is constructed of a reduced number of parts, and has components such as a balancer shaft effectively utilized in relation to other mechanisms such as a transmission of the internal combustion engine, so that the internal combustion engine can be reduced in size and weight.

According to a first aspect of the present invention, there is provided a balancer system in an internal combustion engine which comprises a crankcase, a crankshaft rotatably supported in the crankcase, a clutch, and a transmission including a main shaft extending parallel to the crankshaft and operatively coupled to the crankshaft through the clutch, a transmission gear train, and a countershaft operatively coupled to the main shaft through the transmission gear train, the balancer system comprising a pair of balancer shafts, and a pair of first and second primary counterbalances supported on the balancer shafts, respectively, for rotation about axes parallel to the crankshaft in ganged relation to the crankshaft at the same speed as and in the opposite direction to the crankshaft, the balancer shafts lying parallel to the crankshaft and being positioned one on each side of the crankshaft, the first and second primary counterbalances being rotatable about respective centers which are connected by a line passing through a substantially central portion of the crankshaft, the first and second primary counterbalances being rotatably supported on the balancer shafts near ends thereof, with the centers being spaced from the central portion of the crankshaft by substantially equal distances.

With the above arrangement, the first and second primary counterbalance, when rotated, produce moments with respect to the central portion of the crankshaft due to inertial forces perpendicular to the crankshaft. Since the primary counterbalances are positioned as described above and rotate in the same direction as each other, the produced moments are canceled out. With the primary counterbalances positioned near the ends of the balancer shafts, it is possible to utilize intermediate portions of the balancer shafts for the support thereon of other components such as secondary counterbalances and gears.

According to the first aspect of the present invention, one of the balancer shafts comprises the main shaft of the transmission, the first primary counterbalance being rotatably supported on the main shaft.

Therefore, one of the balancer shafts doubles as the main shaft of the transmission. Since the balancer shaft is used as the main shaft of the transmission, the number of dedicated components of the balancer system is reduced, and the internal combustion engine is reduced in weight and size.

According to the first aspect of the present invention, the clutch has a clutch outer rotatably mounted on the main shaft, further including a primary drive gear corotatably mounted on the crankshaft and a primary driven gear rotatably mounted on the main shaft for rotation with the clutch outer, the primary drive and driven gears being held in mesh with each other at a gear ratio of 1:1, and a hollow shaft rotatably mounted on the main shaft, the first primary counterbalance being disposed on the hollow shaft and corotatably coupled to the primary driven gear.

Inasmuch as the first primary counterbalance is rotated in ganged relation to the crankshaft at the same speed as and in the opposite direction to the crankshaft through the clutch, the clutch is effectively utilized as a drive means for the first primary counterbalance. The clutch outer of the clutch is also rotated at the same speed as the crankshaft through the primary drive gear and the primary driven gear, and hence any input torque applied to the clutch is reduced, so that the clutch is allowed to be reduced in capacity and size. The main shaft and the first primary counterbalance are rotated in the opposite direction to and at the same speed as the crankshaft through the clutch. Therefore, it is possible to reduce the capacity of a bearing by which the first primary counterbalance is rotatably mounted on the main shaft, and to increase the durability of such a bearing.

According to the first aspect of the present invention, the hollow shaft has an outer peripheral surface rotatably supported in the crankcase through a bearing, the first primary counterbalance and the primary driven gear being positioned closely one on each side of the bearing.

Because the first primary counterbalance is rotated with the hollow shaft and the primary driven gear around the main shaft near the gearing, the displacement of the first primary counterbalance in the radial direction of the hollow shaft and the main shaft due to the center of gravity of the first primary counterbalance being eccentric with respect to the main shaft is limited by the bearing. Accordingly, the hollow shaft and the main shaft are prevented from being subjected to localized wear.

According to the first aspect of the present invention, the other of the balancer shafts is rotatably supported with respect to the crankcase parallel to the crankshaft, the second primary counterbalance being corotatably disposed on the other balancer shaft, further including a primary drive gear corotatably mounted on the crankshaft and a driven gear corotatably mounted on the other balancer shaft, the primary drive gear and the driven gear being held in mesh with each other at a gear ratio of 1:1.

The second primary counterbalance rotates with the other balancer shaft in ganged relation to the crankshaft at the same speed as and in the opposite direction to the crankshaft through the primary drive gear and the driven gear. Therefore, the second primary counterbalance is driven with a relatively simple arrangement.

According to a second aspect of the present invention, there is provided a balancer system in an internal combustion engine which comprises a crankcase, a crankshaft rotatably supported in the crankcase, a clutch, and a transmission including a main shaft extending parallel to the crankshaft and operatively coupled to the crankshaft through the clutch, a transmission gear train, and a countershaft operatively coupled to the main shaft through the transmission gear train, the balancer system comprising a pair of balancer shafts, and a pair of first and second primary counterbalances supported on the balancer shafts, respectively, for rotation about axes parallel to the crankshaft in ganged relation to the crankshaft at the same speed as and in the opposite direction to the crankshaft, one of the balancer shafts comprising the main shaft of the transmission, the first primary counterbalance being rotatably supported on one end of the main shaft.

With the above arrangement, the main shaft of the transmission is employed as a balancer shaft for supporting the first primary counterbalance. As a result, the number of dedicated components of the balancer system is reduced, and the weight and size of the internal combustion engine are also reduced.

According to the second aspect of the present invention, the clutch has a clutch outer rotatably mounted on the main shaft, further including a primary drive gear corotatably mounted on the crankshaft and a primary driven gear rotatably mounted on the main shaft for rotation with the clutch outer, the primary drive and driven gears being held in mesh with each other at a gear ratio of 1:1, and a hollow shaft rotatably mounted on the main shaft, the first primary counterbalance being disposed on the hollow shaft and corotatably coupled to the primary driven gear.

As with the first aspect of the present invention, the clutch is effectively utilized as a drive means for the first primary counterbalance, and is reduced in capacity and size. It is possible to reduce the capacity of a bearing by which the first primary counterbalance is rotatably mounted on the main shaft, and to increase the durability of such a bearing.

According to the second aspect of the present invention, the hollow shaft has an outer peripheral surface rotatably supported in the crankcase through a bearing, the first primary counterbalance and the primary driven gear being positioned closely one on each side of the bearing.

This arrangement prevents the hollow shaft and the main shaft from undergoing localized wear.

According to the second aspect of the present invention, the other of the balancer shafts is rotatably supported with respect to the crankcase parallel to the crankshaft, the second primary counterbalance being corotatably disposed on the other balancer shaft, further including a primary drive gear corotatably mounted on the crankshaft and a driven gear corotatably mounted on the other balancer shaft, the primary drive gear and the driven gear being held in mesh with each other at a gear ratio of 1:1.

With this arrangement, the second primary counterbalance can be driven with a relatively simple arrangement.

According to a third embodiment of the present invention, there is provided a balancer system in an internal combustion engine which comprises a crankcase, a crankshaft rotatably supported in the crankcase, a clutch, and a transmission including a main shaft extending parallel to the crankshaft and operatively coupled to the crankshaft through the clutch, a transmission gear train, and a countershaft operatively coupled to the main shaft through the transmission gear train, the balancer system comprising a pair of balancer shafts, and a pair of first and second secondary counterbalances supported on the balancer shafts, respectively, for rotation about axes parallel to the crankshaft in ganged relation to the crankshaft at a speed twice the speed of the crankshaft and in mutually opposite directions, the counterbalances being disposed closely to a plane which passes near a substantially central portion of the crankshaft in the crankcase and extends perpendicularly to the crankshaft.

The first and second secondary counterbalances produce a pair of inertial forces directed perpendicularly to the crankshaft and opposite to each other when they rotate in the mutually opposite directions. At this time, if the secondary counterbalances were spaced by a relatively large gap in the axial direction of the crankshaft, then a couple of forces would be produced perpendicularly to the crankshaft due to the pair of inertial forces. However, since the secondary counterbalances are positioned as described above, the generation of such a couple of forces is prevented.

According to the third aspect of the present invention, one of the balancer shafts comprises the countershaft of the transmission, the first secondary counterbalance being rotatably supported on the countershaft.

The countershaft of the transmission doubles as one of the balancer shafts. Consequently, the number of dedicated components of the balancer system is reduced, and so are the weight and size of the internal combustion engine.

According to the third aspect of the present invention, the clutch has a clutch outer rotatably mounted on the main shaft of the transmission for rotation in ganged relation to the crankshaft, further including a drive gear rotatably mounted on the main shaft for rotation with the clutch outer and a driven gear rotatably mounted on the countershaft for rotation with the first secondary counterbalance, the drive and driven gears being held in mesh with each other for rotating the first secondary counterbalance at the speed twice the speed of the crankshaft.

The first secondary counterbalance is rotated in ganged relation to the crankshaft at the speed twice the speed of the crankshaft through the clutch, the drive gear, and the driven gear. The clutch effectively doubles as a drive means for the first secondary counterbalance, and the drive means may be simplified in construction. Because the countershaft which is connected through the transmission gear train to the main shaft which rotates in the same direction as the clutch outer, and the first secondary counterbalance which is connected to the clutch outer through the drive gear and the driven gear are rotated in the same direction, the capacity of a bearing by which the first secondary counterbalance is rotatably supported on the countershaft is reduced, and its durability is increased.

According to the third aspect of the present invention, the balancer system further includes a hollow shaft rotatably mounted concentrically on the countershaft of the transmission, the first secondary counterbalance and the driven gear being integrally disposed on the hollow shaft.

The first secondary counterbalance and the driven gear are supported on the countershaft through the hollow shaft with a relatively small and simple arrangement using a needle bearing or the like.

According to the third aspect of the present invention, the internal combustion engine has an engine starter having a starter gear for rotating the crankshaft to start the internal combustion engine, the driven gear being held in mesh with the starter gear.

Drive power from the engine starter is transmitted to the crankshaft through the drive and driven gear which drive the first secondary counterbalance and the clutch. Accordingly, some of the components of the balancer system double as components of the engine starter, and hence the number of components of the internal combustion engine is reduced. If the engine starter comprises a starter motor, for example, since the driven gear rotates with the first secondary counterbalance at the speed twice the speed of the crankshaft, the drive power from the engine starter is reduced in speed and transmitted to the crankshaft through the driven and drive gears. Thus, it is possible to reduce the speed reduction ratio of the starter motor, and to reduce the size of a speed reduction gear of the starter motor.

According to the third aspect of the present invention, the other of the balancer shafts extends parallel to the crankshaft with the crankshaft positioned between the main shaft and the other balancer shaft, the second secondary counterbalance being rotatably supported on the other balancer shaft, further including a drive gear on an outer peripheral surface of a crank web of the crankshaft, and a driven gear rotatably mounted on the other balancer shaft for rotation with the second secondary counterbalance, the drive gear and the driven gear being held in mesh with each other at a gear ratio of 2:1.

The second secondary counterbalance rotates in ganged relation to the crankshaft at the speed twice the speed of the crankshaft through the drive gear on the crank web and the driven gear. As a consequence, the drive mechanism for the second secondary counterbalance is relatively simple in construction, and the other balancer shaft is disposed closely to the crankshaft, thereby allowing the internal combustion engine to be reduced in size.

According to a fourth aspect of the present invention, there is provided a balancer system in an internal combustion engine which comprises a crankcase, a crankshaft rotatably supported in the crankcase, a clutch, and a transmission including a main shaft extending parallel to the crankshaft and operatively coupled to the crankshaft through the clutch, a transmission gear train, and a countershaft operatively coupled to the main shaft through the transmission gear train, the balancer system comprising a pair of balancer shafts, and a pair of first and second secondary counterbalances supported on the balancer shafts, respectively, for rotation about axes parallel to the crankshaft in ganged relation to the crankshaft at a speed twice the speed of the crankshaft and in mutually opposite directions, one of the balancer shafts comprising the countershaft of the transmission, the first secondary counterbalance being rotatably supported on the countershaft.

With this arrangement, the countershaft of the transmission doubles as one of the balancer shafts which supports the first secondary counterbalance. Accordingly, the number of dedicated components of the balancer system is reduced, and the internal combustion engine is also reduced in weight and size.

According to the fourth aspect of the present invention, the clutch has a clutch outer rotatably mounted on the main shaft of the transmission for rotation in ganged relation to the crankshaft, further including a drive gear rotatably mounted on the main shaft for rotation with the clutch outer and a driven gear rotatably mounted on the countershaft for rotation with the first secondary counterbalance, the drive and driven gears being held in mesh with each other for rotating the first secondary counterbalance at the speed twice the speed of the crankshaft.

As with the third aspect of the present invention, the clutch effectively doubles as a drive means for the first secondary counterbalance, and the drive means may be simplified in construction. The capacity of a bearing by which the first secondary counterbalance is rotatably supported on the countershaft is reduced, and its durability is increased.

According to the fourth aspect of the present invention, the balancer system further includes a hollow shaft rotatably mounted concentrically on the countershaft of the transmission, the first secondary counterbalance and the driven gear being integrally disposed on the hollow shaft.

With this construction, the first secondary counterbalance and the driven gear are supported on the countershaft with a relatively small and simple arrangement.

According to the fourth aspect of the present invention, the internal combustion engine has an engine starter having a starter gear for rotating the crankshaft to start the internal combustion engine, the driven gear being held in mesh with the starter gear.

Some of the components of the balancer system are therefore effectively utilized as components of the engine starter, and the number of components of the internal combustion engine is reduced. If the engine starter comprises a starter motor, for example, then the size of the speed reduction gear of the starter motor may be reduced.

According to the fourth aspect of the present invention, the other of the balancer shafts extends parallel to the crankshaft with the crankshaft positioned between the main shaft and the other balancer shaft, the second secondary counterbalance being rotatably supported on the other balancer shaft, further including a drive gear on an outer peripheral surface of a crank web of the crankshaft, and a driven gear rotatably mounted on the other balancer shaft for rotation with the second secondary counterbalance, the drive gear and the driven gear being held in mesh with each other at a gear ratio of 2:1.

The above arrangement simplifies the drive mechanism for the second secondary counterbalance, and the other balancer shaft is disposed closely to the crankshaft, resulting in a concomitant reduction in the size of the internal combustion engine.

According to a fifth aspect of the present invention, there is provided a balancer system in an internal combustion engine which comprises a crankcase, a crankshaft rotatably supported in the crankcase, a clutch, and a transmission including a main shaft extending parallel to the crankshaft and operatively coupled to the crankshaft through the clutch, a transmission gear train, and a countershaft operatively coupled to the main shaft through the transmission gear train, the balancer system comprising a plurality of balancer shafts, a pair of first and second primary counterbalances supported on two of the balancer shafts, respectively, for rotation about axes parallel to the crankshaft in ganged relation to the crankshaft at the same speed as and in the opposite direction to the crankshaft, and a pair of first and second secondary counterbalances supported on two of the balancer shafts, respectively, for rotation about axes parallel to the crankshaft in ganged relation to the crankshaft at a speed twice the speed of the crankshaft and in mutually opposite directions, the balancer shafts which support the first primary counterbalance and the first secondary counterbalance comprising the main shaft and the countershaft of the transmission, the first primary counterbalance being rotatably supported on the main shaft, and the first secondary counterbalance being rotatably supported on the countershaft.

With the above arrangement, the main shaft and countershaft of the transmission double as the balancer shafts which support the first and second primary counterbalances, respectively. Therefore, the number of dedicated components of the balancer system is reduced, and so are the weight and size of the internal combustion engine.

According to the fifth aspect of the present invention, the balancer system further comprises drive means for rotating the first secondary counterbalance at the speed twice the speed of the crankshaft in ganged relation to the first primary counterbalance, the first primary counterbalance and the first secondary counterbalance being operatively connected to each other through the drive means.

When the first primary counterbalance rotates in ganged relation to the crankshaft, the first secondary counterbalance is rotated at the speed twice the speed of the crankshaft by the drive means. Thus, the mechanism by which the first secondary counterbalance is ganged with the crankshaft is simplified in structure, and the number of dedicated components of the balancer system is reduced.

According to the fifth aspect of the present invention, the drive means comprises a drive gear rotatably mounted on the main shaft for rotation with the first primary counterbalance, and a driven gear rotatably mounted on the countershaft for rotation with the first secondary counterbalance, the drive and driven gears being held in mesh with each other at a gear ratio of 2:1, the first primary counterbalance being rotatably mounted on the main shaft in a position between the first secondary counterbalance and the driven gear.

In the case where the first primary counterbalance, the first secondary counterbalance, and the drive means are disposed closely to each other, their arrangement is reduced in size, and the main shaft and the countershaft of the transmission may be shortened.

According to the fifth aspect of the present invention, the balancer system further includes a first hollow shaft rotatably mounted concentrically on the main shaft of the transmission, the first primary counterbalance and the drive gear being integrally disposed on the first hollow shaft, and a second hollow shaft rotatably mounted concentrically on the countershaft of the transmission, the first secondary counterbalance and the driven gear being integrally disposed on the hollow shaft.

With this arrangement, the combination of the first primary counterbalance and the drive gear and the combination of the first secondary counterbalance and the driven gear are supported respectively on the main shaft and the countershaft through relatively small and simple arrangements.

According to the fifth aspect of the present invention, the clutch has a clutch outer rotatably mounted on the main shaft of the transmission, further including a primary drive gear rotatably mounted on the crankshaft and a primary driven gear rotatably mounted on the main shaft for rotation with the clutch outer, the primary drive and driven gears being held in mesh with each other at a gear ratio of 1:1, the first primary counterbalance being corotatably coupled to the primary driven gear through the first hollow shaft.

The first primary counterbalance and the first secondary counterbalance are ganged with the crankshaft through the clutch, which thus doubles as the drive mechanism for the first primary counterbalance and the first secondary counterbalance. Inasmuch as the first primary counterbalance and the first secondary counterbalance rotate with the first and second hollow shafts in the same direction as the main shaft and countershaft of the transmission, the capacity of bearings by which the first and second hollow shafts are supported respectively on the main shaft and the countershaft is reduced, and their durability is increased.

According to the fifth aspect of the present invention, the internal combustion engine comprises a single-cylinder engine, the crankshaft comprises a pair of crank webs disposed in the crankcase, a first crankshaft member having a crankpin integral with one of the crank webs and interconnecting the crank webs to each other, and a second crankshaft member having the other of the crank webs, the one of the crank webs having a thin portion integral with the crankpin, defining a gap between the one crank web and an inner wall of the crankcase, the drive gear being rotatable about the main shaft in the gap when the crankshaft rotates.

This arrangement allows the drive gear and the first primary counterbalance to be positioned near the crank web of the first crankshaft member and the inner wall of the crankcase. Consequently, a reduction in the size of the internal combustion engine can be achieved.

According to the fifth aspect of the present invention, the balancer shaft which supports the second primary counterbalance is rotatably supported in the crankcase parallel to the crankshaft, the second primary counterbalance being corotatably disposed on the last-mentioned balancer shaft, the second secondary counterbalance being rotatably supported on the last-mentioned balancer shaft.

The balancer shaft is therefore shared by the second primary counterbalance and the second secondary counterbalance. Therefore, the number of counter shafts of the balancer system is reduced, and the weight and size of the internal combustion engine are also reduced.

According to the fifth aspect of the present invention, the balancer shaft which supports the second primary counterbalance extends parallel to the crankshaft with the crankshaft positioned between the last-mentioned balancer shaft and the main shaft, the first and second primary counterbalances being positioned one on each side of a plane which passes a central portion of the crankshaft in the crankcase and extends perpendicularly to the crankshaft and being positioned respectively near outer portions of the main shaft and the last-mentioned balancer shaft in axial directions thereof, the first and second secondary counterbalances being positioned respectively near inner portions of the countershaft and the last-mentioned balancer shaft in axial directions thereof.

With the above arrangement, the primary counterbalances which rotate in the same direction are disposed such that they are spaced substantially equal distances from the central portion of the crankshaft in the axial direction of the crankshaft, and the secondary counterbalances which rotate in the opposite directions are disposed closely to the plane which passes through the central portion of the crankshaft perpendicularly to the crankshaft. This disposition of the counterbalances is effective to suppress the generation of a couple of forces due to the rotation of the primary counterbalances and the secondary counterbalances. Particularly, the primary counterbalances are positioned near outer portions of the main shaft and the balancer shaft in their axial directions, thereby shortening the main shaft and the balancer shaft.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENT

Figure 1:
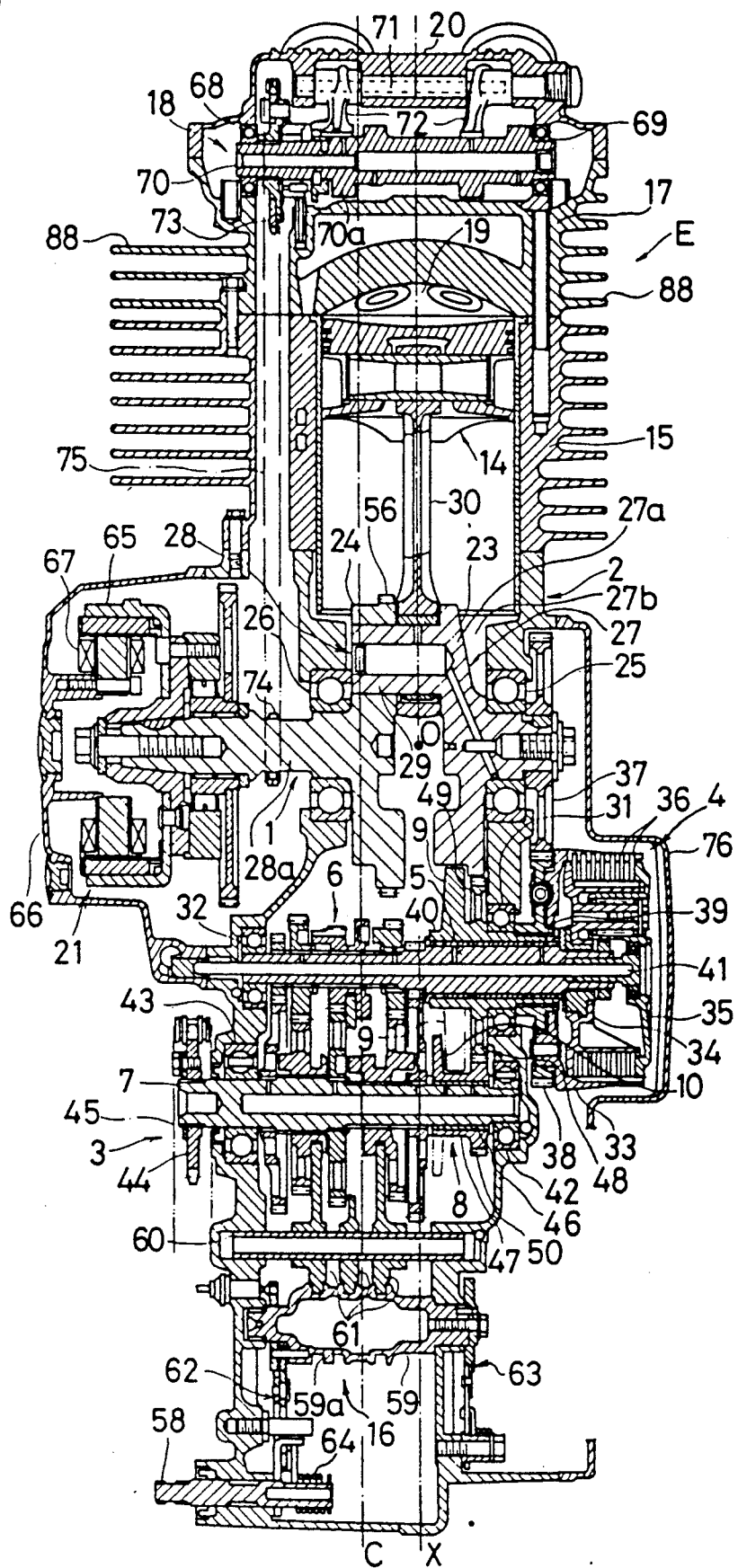
FIG. 1 is a longitudinal cross-sectional view of a single-cylinder four-cycle engine for use on a motorcycle, the engine incorporating a balancer system according to the present invention.
Figure 2:
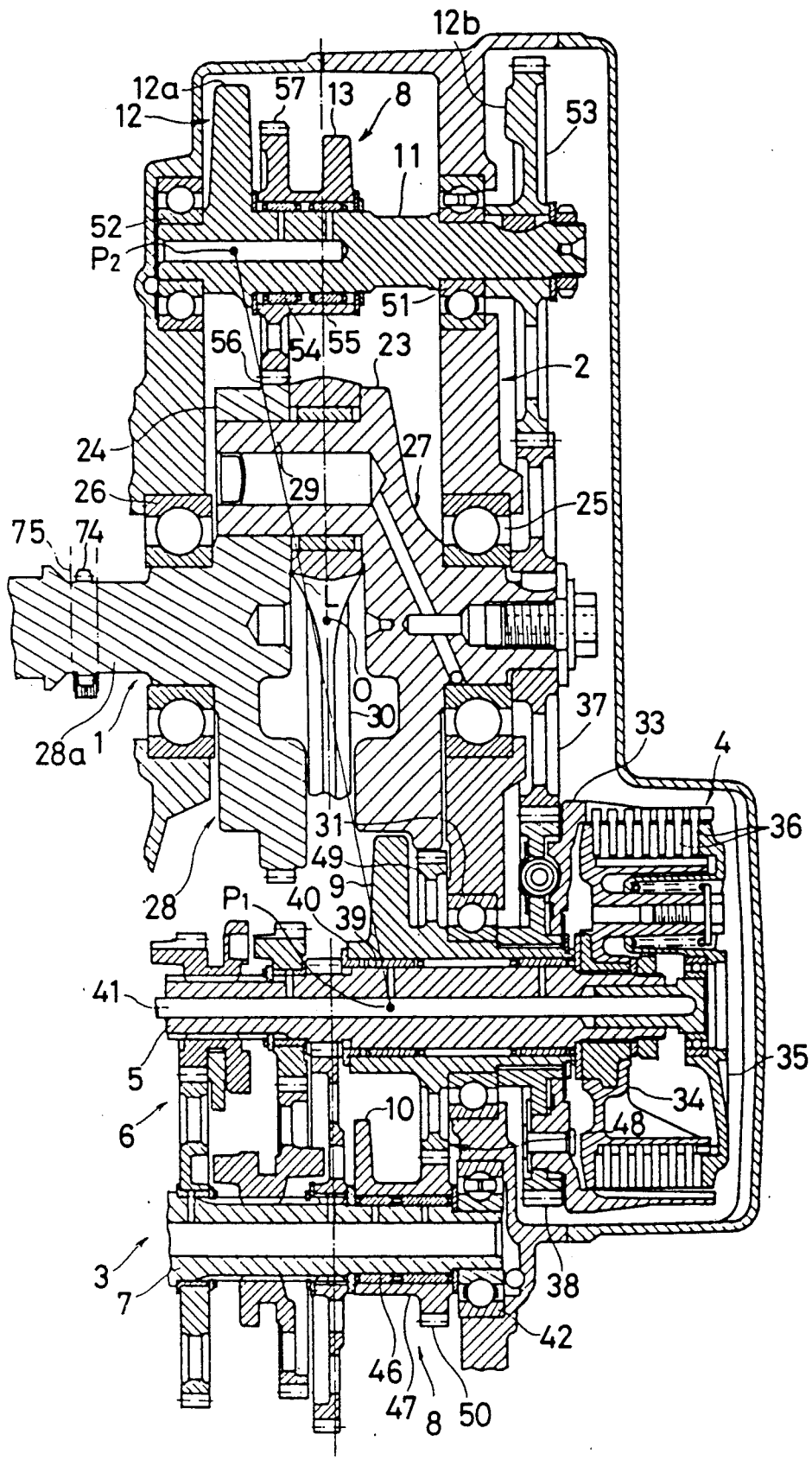
FIG. 2 is an enlarged fragmentary cross-sectional view of the engine shown in FIG. 1.
Figure 3:
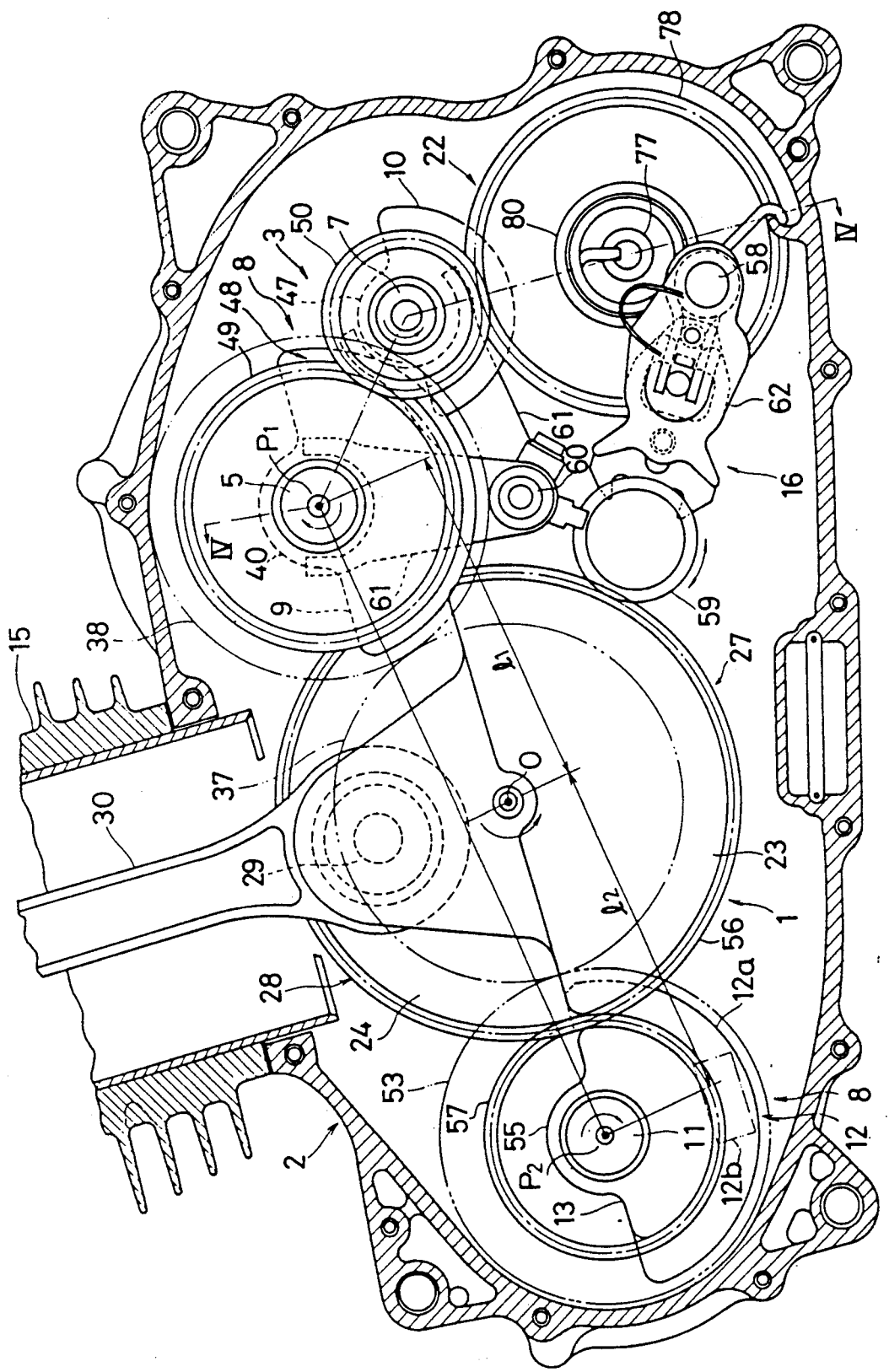
FIG. 3 is an enlarged fragmentary cross-sectional view of the engine shown in FIG. 1.

As shown in FIGS. 1 through 3, a single-cylinder four-cycle internal combustion engine E for use on a motorcycle has a crankshaft 1 rotatably supported in a crankcase 2, and a transmission 3 having a main shaft 5 operatively coupled to the crankshaft 1 through a clutch 4 and a countershaft 7 operatively coupled to the main shaft 5 through a transmission gear train 6. A balancer system comprises a first primary counterbalance 9 and a first secondary counterbalance 10 which are rotatably mounted respectively on the main shaft 5 and the countershaft 7 that double as balancer shafts, and a second primary counterbalance 12 and a second secondary counterbalance 13 which are rotatably mounted on a balancer shaft 11 (FIG. 3) which is rotatably supported in the crankcase 2. A piston 14 is slidably movable in a cylinder block 15 mounted on the crankcase 2. The transmission 3 is actuated by a transmission actuator 16 which is operatively connected to the transmission gear train 6. The cylinder block 15 supports thereon a cylinder head 17 which is covered with a head cover 20. The head cover 20 accommodates therein an intake/discharge device 18 for introducing an air-fuel mixture into and discharging exhaust gases from a combustion chamber 19 which is defined between the cylinder head 17 and the piston 14. A generator or alternator 21 is mounted on an end of the crankshaft 21. An engine starter comprising a kick starter 22 (FIG. 4) for starting the engine E is mounted in the crankcase 2.

As shown in FIG. 1, the crankshaft 1 has a pair of crank webs 23, 24 housed in the crankcase 2, and is rotatably supported in the crankcase 2 by bearings 25, 26 on outer sides of the crank webs 23, 24, respectively.

The crankshaft 1 comprises a crankshaft member 27 having the crank web 23 and a crankshaft member 28 having the crank web 24. The crankshaft members 27, 28 are securely coupled to each other by a crankpin 29 which projects axially from the crank web 23 and forcefitted in the crank web 24. The crankpin 29 is operatively connected to the piston 14 by a connecting rod 30 so that the crankshaft 1 is rotated about its own axis in response to reciprocating movement of the piston 14 in the cylinder block 15.

The portion of the crank web 23 from which the crankpin 29 projects is thinned out as a thin portion 27a which has an obliquely slanted surface facing an inner wall of the crankcase 2, leaving a gap 27b between the thin portion 27a and the inner wall of the crankcase 2.

Since the thin portion 27a of the crank web 23 has the integral crankpin 29, the mechanical strength of the crankshaft 1 is not lowered by the thin portion 27a.

As shown in FIG. 1, the main shaft 5 of the transmission 3 lies parallel to the crankshaft 1 in the crankcase 2, and is rotatably supported in the crankcase 2 by bearings 31, 32. The clutch 4 is mounted on an end of the main shaft 5 which projects from the crankcase 2 on the same side as the crank web 23.

As shown in FIG. 2, the clutch 4 comprises a clutch outer 33 positioned near the crankcase 2 and fitted concentrically over the projecting end of the main shaft 5 and a clutch inner 34 accommodated in the clutch outer 33 and fitted over the main shaft 5 for rotation therewith. A plurality of interleaved clutch plates 36 are coupled to and disposed between the clutch outer 33 and the clutch inner 34. When the clutch plates 36 are pressed into frictional engagement with each other, the clutch outer 33 and the clutch inner 34 are connected to each other for rotation about the axis of the main shaft 5.

A primary drive gear 37 is fixedly mounted on the end of the crankshaft 1 which projects out of the crankcase 2 from the bearing 25. The primary drive gear 37 is held in mesh with a primary driven gear 38 which is fixed to an end face of the clutch outer 33 which faces the crankcase 2, the primary driven gear 38 being concentric to the main shaft 5. The gear ratio of the primary drive and driven gears 37, 38 is 1:1. The primary driven gear 38 is splined to an outer circumferential surface of an end of a hollow shaft 40 which projects from the crankcase 2, the hollow shaft 40 being rotatably mounted concentrically on the main shaft 5 by a needle bearing 39. Therefore, the primary driven gear 38 is rotatable with the hollow shaft 40.

When the crankshaft 1 rotates about its own axis, the clutch outer 38 and the hollow shaft 40 are rotated about the axis of the main shaft 5 through the primary drive and driven gears 37, 38 at the same speed as the crankshaft 1 in the opposite direction to the crankshaft 1. At this time, if the clutch 4 is engaged, the clutch inner 34 and the main shaft 5 are rotated about their axes in unison with the clutch outer 33 and the hollow shaft 40 through the interleaved clutch plates 36 which are pressed together into frictional engagement.

As illustrated in FIG. 1, the clutch 4 has a push rod 41 which is slidably inserted concentrically in the main shaft S and extends toward a lifter plate 35. When the push rod 41 is axially pushed by a clutch actuator (not shown) to move the lifter plate 35 in a direction away from the clutch inner 35, the clutch plates 36 are released from mutual frictional engagement, whereupon the clutch 4 is disengaged and the clutch inner 34 and the main shaft 5 are not rotated.

The countershaft 7 of the transmission 3 lies parallel to the crankshaft 1 in the crankcase 2 with the main shaft 5 positioned between the crankshaft 1 and the countershaft 7. The countershaft 7 is rotatably supported in the crankcase 2 by bearings 42, 43. The countershaft 7 is operatively coupled to the main shaft 5 by the transmission gear train 6, which is arranged along the main shaft 5 and the countershaft 7 within the crankcase 2 and positioned up to the ends of the main shaft 5 and the countershaft 7 near the crank web 24. As is the case with conventional transmissions, the countershaft 7 can be rotated in ganged relation to the main shaft 5 at one of several speeds through a selected combination of gears of the transmission gear train 6.

A drive sprocket 44 is fitted over an end of the countershaft 7 which projects out of the crankcase 2 away from the clutch 4. The drive sprocket 44 is operatively coupled to a rear wheel Wr (see FIG. 7) of a motorcycle through an endless chain 45.

Therefore, drive forces produced when the piston 14 reciprocally moves are transmitted to the rear wheel Wr successively through the crankshaft 1, the clutch 4, the main shaft 5 of the transmission 3, the transmission gear train 6, the countershaft 7, the drive sprocket 45, and the chain 44.

As shown in FIG. 2, the first primary counterbalance 9 of the balancer system 8 is integrally disposed on the end of the hollow shaft 40 within the crankcase 2 near the bearing 31. The first primary counterbalance 9 is therefore rotatably supported on the main shaft 5 through the hollow shaft 40.

A hollow shaft 47 is rotatably mounted concentrically on the countershaft 7 by a needle bearing 46 and confronts the hollow shaft 40 in the crankcase 2. The first secondary counterbalance 10 is integrally disposed on an end of the hollow shaft 47 which is near the transmission gear train 6. Therefore, the first secondary counterbalance 10 is rotatably supported on the countershaft 7 through the hollow shaft 47. The first secondary counterbalance 10 is operatively connected to the hollow shaft 40 through a drive assembly 48 which rotates the first secondary counterbalance 10.

The drive assembly 48 comprises a drive gear 49 integral with the hollow shaft 40 for rotation about the main shaft 5 and positioned axially between the first primary counterbalance 9 and the inner wall of the crankcase 2, and a driven gear 50 integral with the hollow shaft 48 at an end thereof near the inner wall of the crankcase 2 in confronting relation to the drive gear 49 for rotation about the countershaft 7. The drive and driven gears 49, 50 are held in mesh with each other at a gear ratio of 2:1.

Therefore, as shown in FIG. 3, when the crankshaft 1 rotates about its own axis, the first primary counterbalance 9 rotates with the hollow shaft 40 around the main shaft 5 at the same speed as and in the opposite direction to the crankshaft 1, and at the same time the first secondary counterbalance 10 rotates with the hollow shaft 47 around the countershaft 7 at a speed twice the speed of the crankshaft 1 in the same direction as the crankshaft 1 through the drive and driven gears 49, 50 of the drive assembly 48.

The first secondary counterbalance 10 and the driven gear 50 are positioned on the hollow shaft 47 such that the first primary counterbalance 9 rotates in a position between and closely to the first secondary counterbalance 10 and the drive gear 50, as indicated by the imaginary line in FIG. 1. The drive assembly 48, the first primary counterbalance 9, and the first secondary counterbalance 10 are axially positioned between the inner wall of the crankcase 2 and the transmission gear train 6 of the transmission 3 and are successively arranged as closely to each other as possible along the main shaft 5 and the countershaft 7 from the inner wall of the crankcase 2 toward the transmission gear train 6.

The drive gear 49 of the drive assembly 48 is axially positioned such that when the crankshaft 1 rotates, the drive gear 49 rotates around the main shaft 5 in the gap 27b defined between the crank web 23 and the inner wall of the crankcase 2 and closely to the crank web 23 and the crankcase inner wall. The drive gear 49 and the first primary counterbalance 9 are located closely to the primary driven gear 38 with the bearing 31 interposed therebetween.

Since the drive assembly 48, the first primary counterbalance 9, and the first secondary counterbalance 10 are closely arranged, the hollow shafts 40, 47 are rendered as short as possible.

As illustrated in FIGS. 1 and 2, the first secondary counterbalance 10 is positioned near a central plane X which passes through a center 0 of the crankshaft 1 where the axis of the crankshaft 1 and the axis of the piston 14 intersects and extends perpendicularly to the crankshaft 1.

As shown in FIG. 2, the balancer shaft 11 of the balancer system 8 lies parallel to the main shaft 5 and the crankshaft 1 in the crankcase 2, with the crankshaft 1 positioned between the main shaft 5 and the balancer shaft 11. The balancer shaft 11 is rotatably supported in the crankcase 2 by bearings 51, 52. The balancer shaft 11 has an end projecting out of the crankcase 2 on the same side as the crank web 23. A driven gear 53 is mounted concentrically on the projecting end of the balancer shaft 11, and is held in mesh with the primary drive gear 37 at a gear ratio of 1:1.

As shown in FIGS. 2 and 3, the second primary counterbalance 12 of the balancer system 8 comprises a main counterbalance 12a which bears a major portion of the weight of the counterbalance 12 and an auxiliary counterbalance 12b which bears the remaining weight of the counterbalance 12. As shown in FIG. 2, the main counterbalance 12a is integral with an end of the balancer shaft 11 which is on the same side as the crank web 24 in the crankcase 2, so that the main counterbalance 12a is rotatable about the axis of the balancer shaft 11. The auxiliary counterbalance 12b is integral with the driven gear 53, so that the auxiliary counterbalance 12b is rotatable about the axis of the balancer shaft 11.

As shown in FIGS. 2 and 3, the first primary counterbalance 9 and the main counterbalance 12a of the second primary counterbalance 12 are relatively positioned such that a line L connecting a center P1 about which the first primary counterbalance 9 is rotatable and a center P2 about which the main counterbalance 12a is rotatable passes near the center O of the crankshaft 1, and that distances l1, l2 between the center ) and the centers P1, P2, respectively, are substantially equal to each other ($l1 \approx l2$).

The second secondary counterbalance 13 of the balancer system is integral with an end of a hollow shaft 55 which is rotatably mounted concentrically on an intermediate portion of the balancer shaft 11 in the crankcase 2 through a needle bearing 54. The second secondary counterbalance 13 is therefore rotatable about the balancer shaft 11 through the hollow shaft 55. The other end of the hollow shaft 55 supports an integral driven gear 57 concentrically thereon, the driven gear 57 meshing with a drive gear 56 integrally formed with an outer peripheral surface of the crank web 24. The driven and drive gears 57, 56 are held in mesh with each other at a gear ratio of 2:1.

The second secondary counterbalance 13 is positioned closely to the central plane X as with the first secondary counterbalance 10.

When the crankshaft 1 rotates, the main counterbalance 12a and the auxiliary counterbalance 12b rotate with the balancer shaft 11 at the same speed as and in the opposite direction to the crankshaft 1 through the primary drive gear 37 and the driven gear 53, and the second secondary counterbalance 13 rotates with the hollow shaft 55 around the balancer shaft 11 at a speed twice the speed of the crankshaft 1 and in the opposite direction to the crankshaft 1 through the drive gear 56 and the driven gear 57.

As shown in FIG. 1, the transmission actuator 16 comprises a spindle 58 rotatably supported on a side wall of the crankcase 2 parallel to the crankshaft 1, a shift drum 59 rotatably supported in the crankcase 2 parallel to the crankshaft 1, a shift fork shaft 60 supported in the crankcase 2 parallel to the crankshaft 1, and a plurality of shift forks 61 slidably fitted over the shift fork shaft 60. As shown in FIGS. 1 and 3, the shift forks 61 engage the transmission gear train 6 of the transmission 3, and also engage in guide grooves 59a (FIG. 1) defined in an outer peripheral surface of the shift drum 59.

As illustrated in FIGS. 1 and 3, the shift drum 59 engages the spindle 58 through a link arm 62 which is fixed to an end of the spindle 58 in the crankcase 2, so that the shift drum 59 can be rotated when the link arm 62 is angularly moved by the spindle 58. The shift drum 59 has an end projecting out of the crankcase 2 and connected to a stopper 63 (FIG. 1) mounted on an outer surface of the crankcase 2 so that the shift drum 59 can be angularly moved stepwise.

In FIG. 1, when a transmission pedal (not shown) joined to an end of the spindle 59 which projects out of the crankcase 2 is operated on, the shift drum 59 is angularly moved stepwise through the link arm 62. At this time, the shift forks 61 are guided by the guide grooves 59a of the shift drum 59 to slide in the axial direction of the shift fork shaft 60. Some of the gears of the transmission gear train 6 are axially displaced on the main shaft 5 or the countershaft 7, changing meshing gears of the transmission gear train 6, so that rotative power is transmitted from the main shaft 5 to the countershaft 7 at a different speed.

After the spindle 58 has angularly moved beyond a predetermined angle, it returns to its original position under the bias of a return spring 64 mounted on the end of the spring 58 within the crankcase 2.

The generator 21 comprises a flywheel 65 affixed to an end of the crankshaft 1 which projects out of the crankcase 2 away from the clutch 7, and a stator 67 fastened to an inner surface of a generator cover 66 mounted on a side of the crankcase 2, the stator 67 being accommodated in the flywheel 65. When the crankshaft 1 rotates, the flywheel 65 rotates with the crankshaft 1 around the stator 67, which then induces electric energy that is supplied to charge a battery (not shown).

The intake/discharge device 18 comprises a camshaft 70 rotatably supported between the cylinder head 17 and the head cover 20 by bearings 68, 69, and a plurality of rocker arms 72 swingably supported on a rocker arm shaft 71 which is mounted in the head cover 20 parallel to the camshaft 70. A cam driven gear 73 which is integrally mounted on an end of the camshaft 70 is operatively connected by an endless chain 75 to a cam drive gear 74 which is integrally formed on an outer peripheral surface of a small-diameter portion 28a of the crankshaft member 28 axially between the generator 21 and the piston 14. Accordingly, the camshaft 70 can rotate in response to rotation of the crankshaft 1 through the cam drive gear 74, the chain 75, and the cam driven gear 3. The rocker arms 72 are held in sliding engagement with cams 70a on the camshaft 70, and also with intake and exhaust valves (not shown) which selectively open and close intake and exhaust passages (not shown) that communicate with the combustion chamber 19.

When the camshaft 70 rotates in synchronism with the crankshaft 1, the intake and exhaust valves are opened and closed through cams 70a and the rocker arms 72 for thereby introducing an air-fuel mixture into and discharging exhaust gases from the combustion chamber 19.

As shown in FIG. 1, the generator 21, a camshaft drive mechanism which is composed of the cam driven gear 73, the cam drive gear 74, and the chain 75, the piston 14, and the clutch 4 are successively arranged in the axial direction of the crankshaft 1 at substantially equal intervals from a position near one of the ends of the crankshaft 1 toward a position near the other end thereof.

Figure 4:
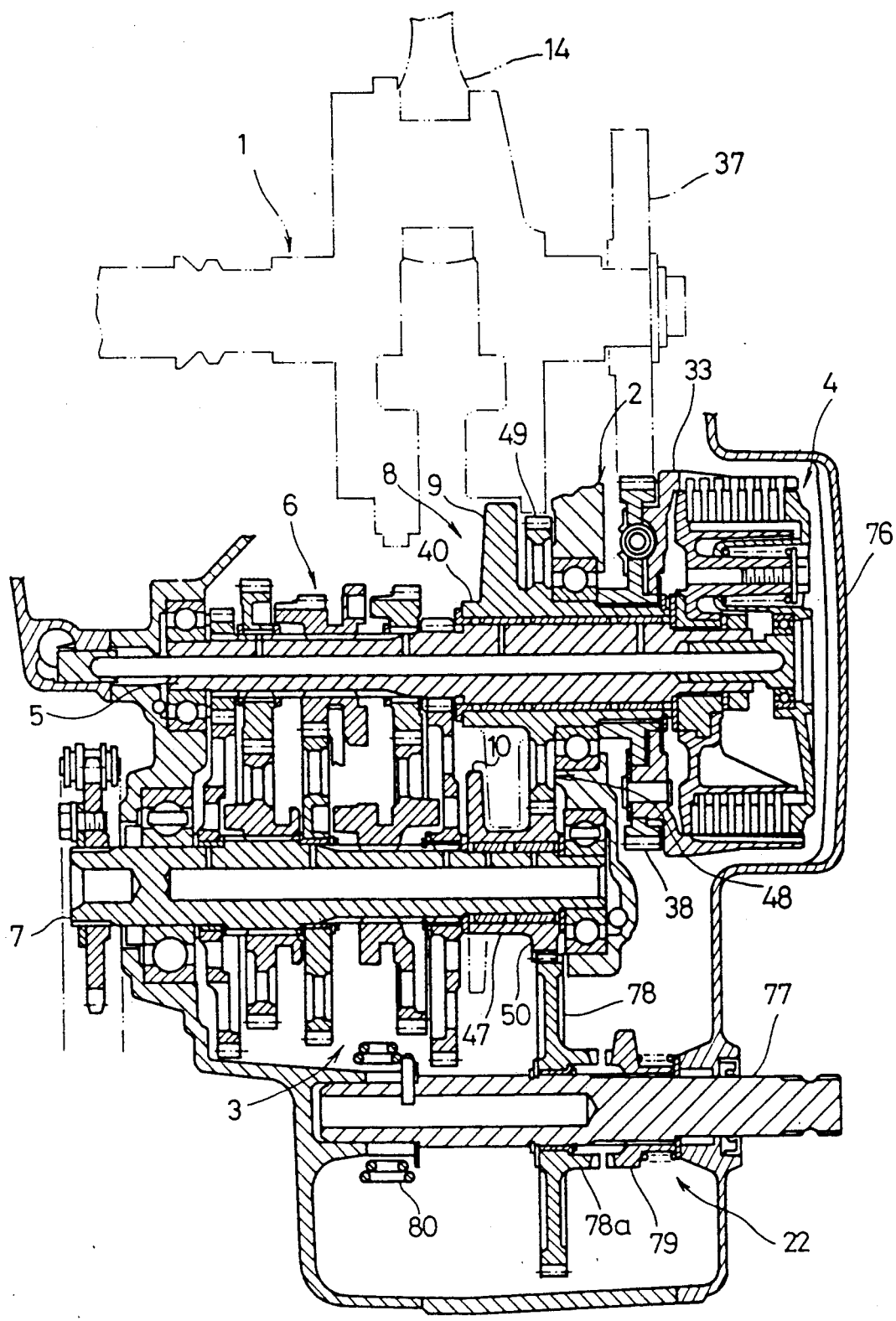
FIG. 4 is a cross-sectional view taken along line IV—IV of FIG. 3.

As illustrated in FIG. 4, the kick starter 22 comprises a starter spindle 77 rotatably mounted on the crankcase 2 and a clutch cover 76 attached to a side of the crankcase 2, and a starter gear 78 rotatably mounted on an intermediate portion of the starter spindle 77 in the crankcase 2. The starter gear 78 is held in mesh with the driven gear 50 on the hollow shaft 47 which has the first secondary counterbalance 10. The starter gear 78 has a ratchet 78a on a side thereof which faces the clutch cover 76. Between the starter gear 78 and the clutch cover 76, there is disposed a drive ratchet 79 which is mounted on the starter spindle 77 but axially slidable therealong, the drive ratchet 79 being normally urged in a direction away from the ratchet 78a.

When a kick pedal (not shown) which is coupled to the starter spindle 77 outside of the clutch cover 76 is operated on, the drive ratchet 79 is axially slid into mesh with the ratchet 78a of the starter gear 78, and the starter spindle 77 is rotated with the driver ratchet 79, whereupon the starter gear 78 is rotated to rotate the hollow shaft 47. The hollow shaft 47 rotates the crankshaft 1 in the same direction, reciprocally moving the piston 14 thereby to start the engine E.

After the starter spindle 77 has rotated beyond a certain angle, it returns to its original position under the resiliency of a return spring 80 which acts on the end of the starter spring 77 within the crankcase 2.

Operation of the balancer system 8 incorporated in the engine E will now be described with reference to FIGS. 2 and 3.

As described above with reference to FIG. 3, the primary counterbalances 9, 12 are rotated at the same speed as and in the opposite direction to the crankshaft 1 in synchronism with the crankshaft 1 for thereby reducing primary vibrations of the engine E, and the secondary counterbalances 10, 13 are rotated at the speed twice that of the crankshaft 1 and in the opposite directions to each other in synchronism with the crankshaft 1 for thereby reducing secondary vibrations of the engine E.

Since the primary counterbalances 9, 12 are spaced from the central plane X, they produce mutually opposite moments with respect to the center of the engine E as they rotate. However, these moments cancel each other because the first primary counterbalance 9 and the main counterbalance 12a which bears a major portion of the weight of the second primary counterbalance 12 are arranged such that the line L connecting the centers P1, P2 passes near the center O of the crankshaft 1 and the distances l1, l2 between the center O and the centers P1, P2 are substantially equal to each other ($l1 \approx l2$), as described above.

The secondary counterbalances 10, 13 rotate in the opposite directions to each other. Therefore, if the secondary counterbalances 10, 13 were spaced from each other in the axial direction of the crankshaft 1, forces would be produced in directions normal to the crankshaft 1 when the secondary counterbalances 10, 13 rotate. However, inasmuch as the secondary counterbalances 10, 13 are positioned in the vicinity of the central plane X, the generation of such forces is suppressed.

Such a disposition of the primary counterbalances 9, 12 and the secondary counterbalances 10, 13 is made possible by positioning the primary counterbalances 9, 12 near the ends of the main shaft 5 and the balancer shaft 11 and positioning the secondary counterbalances 10, 13 inwardly of the primary counterbalances 9, 12 within the crankcase 2.

The first primary counterbalance 9 and the first secondary counterbalance 10 are located near the ends of the main shaft 5 and the countershaft 7 close to each other, and the hollow shafts 40, 47 are rendered as short as possible. With this arrangement, the transmission gear train 6 is unobstructedly arranged along the main shaft 5 and the auxiliary shaft 7. Consequently, while the main shaft 5 and the countershaft 7 are reduced in length, the first primary counterbalance 9 and the first secondary counterbalance 10 are effectively operable as counterbalances.

The second primary counterbalance 12 is positioned near the ends of the balancer shaft 11. This arrangement effectively utilizes the intermediate portion of the balancer shaft 11 for the support of the second secondary counterbalance 13 and the driven gear 57.

The main shaft 5 and countershaft 7 of the transmission 3 and the balancer shaft 11 are therefore effectively employed as components of the balancer system 8. As a result, the number of dedicated components of the balancer system 8 is reduced, and the engine E is rendered small in size, light in weight, and low in cost.

Any independent means for operatively interlinking the first secondary counterbalance 10 to the crankshaft 1 is not employed in the balancer system 8. Rather, the first secondary counterbalance 10 is operatively ganged with the crankshaft 1 through the drive assembly 48 and the first primary counterbalance 9. This arrangement is also effective to reduce the number of parts of the balancer system 8. The drive assembly 48 is of a simple construction which is composed of the drive gear 49 and the driven gear 50. As a consequence, the engine E is also rendered small in size and light in weight by this structure. Since the first primary counterbalance 9 and the first secondary counterbalance 10 are operatively ganged to the crankshaft 1 through the clutch outer 33 of the clutch 4, the clutch 4 doubles as a drive mechanism for the first primary counterbalance 9 and the first secondary counterbalance 10.

The hollow shaft 40 with the first primary counterbalance 9 and the hollow shaft 47 with the second secondary counterbalance 10 rotate in the same direction as the main shaft 5 and the countershaft 7, respectively, of the transmission 3. Therefore, the load capacity of the needle bearings 39, 46 by which the counterbalances 9, 10 are rotatably mounted on the main shaft 5 and the countershaft 7 is reduced, with the result that the durability of the needle bearings 39, 46 is increased and the cost thereof is lowered. This is true of the needle bearing 54 by which the hollow shaft 55 is rotatably supported on the balancer shaft 11 since the hollow shaft 55 rotates in the same direction as the balancer shaft 11.

The first primary counterbalance 9 and the primary driven gear 38 which are coupled to each other through the hollow shaft 40 with the bearing 31 interposed therebetween which supports the outer peripheral surface of the hollow shaft 40. When the first primary counterbalance 9 whose center of gravity is eccentrically positioned with respect to the main shaft 5 is rotated, any radial displacement of the main shaft 5 and the hollow shaft 40 is easily limited by the bearing 31, and hence the main shaft 5 and the hollow shaft 40 are prevented from being subject to localized wear.

An input torque is applied to the clutch 4 from the crankshaft 1 through the primary drive gear 37 and the primary driven gear 38. Since the gears 37, 38 are held in mesh with each other at a gear ratio of 1:1 so that the first primary counterbalance 9 rotates at the same speed as the crankshaft 1, the input torque applied to the clutch 4 is relatively small, and thus the clutch 4 may be reduced in capacity and size.

The kick starter 22, when operated, rotates the crankshaft 1 through the driven gear 50 meshing with the starter gear 78 and serving as a component of the balancer system 8. Accordingly, this component of the balancer system 8 is effectively utilized as a component of the kick starter 22, and the number of parts of the kick starter 22 is reduced.

As described above, the number of dedicated components of the balancer system 8 is reduced as much as possible, and the components of the balancer system 8 are spatially and operatively effectively utilized, and reduced in weight and size, resulting in a concomitant reduction in the size and weight of the engine E.

Another engine which incorporates the balancer system according to the present invention will be described with reference to FIG. 5. The engine, denoted at E', shown in FIG. 5 employs a starter motor as an engine starter.

Figure 5:
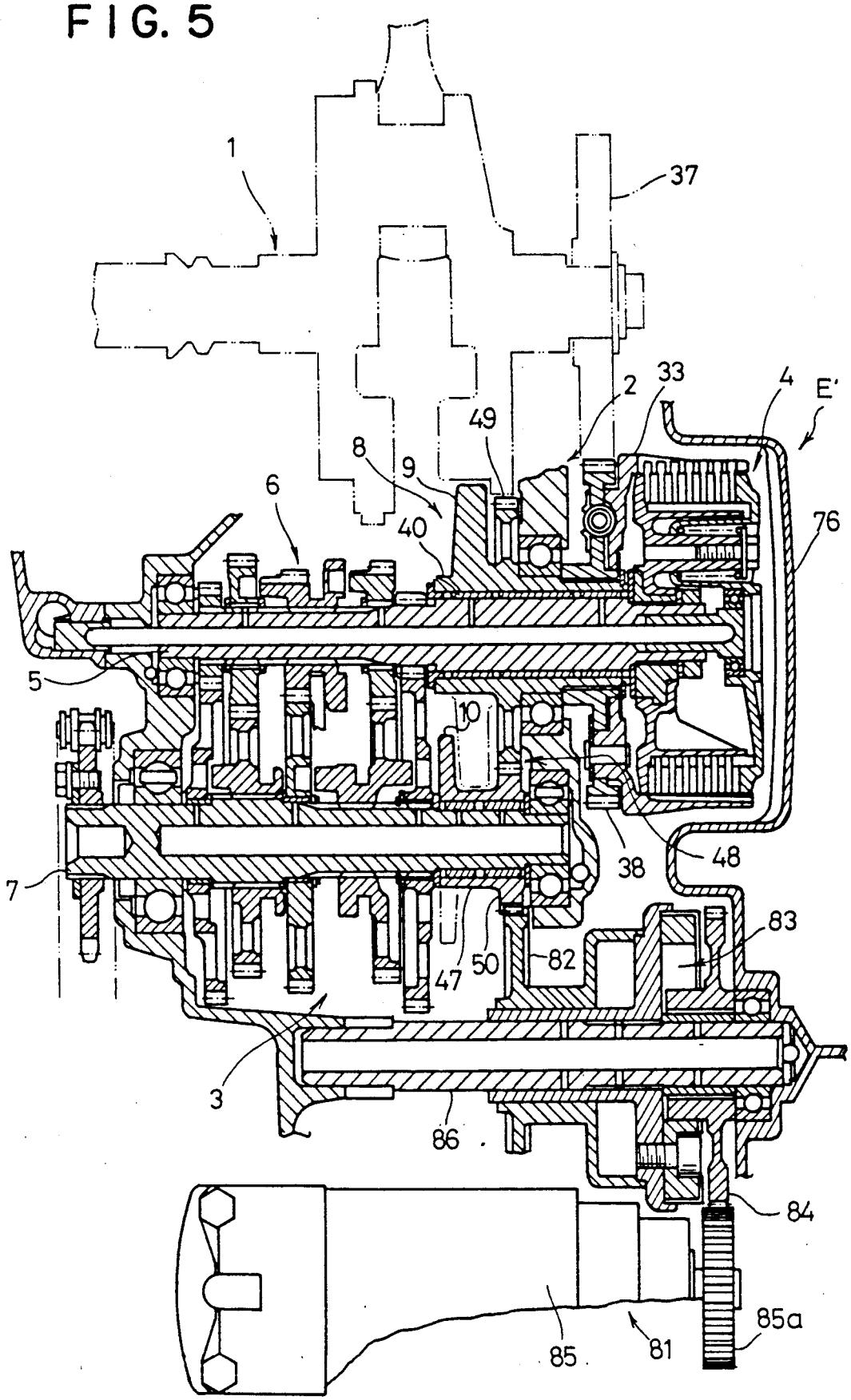
FIG. 5 is a fragmentary cross-sectional view of another engine incorporating the balancer system according to the present invention.

Those parts shown in FIG. 5 which are identical to those shown in FIGS. 1 through 4 are denoted by identical reference numerals, and will not be described in detail.

The crankshaft 1, the transmission 3, and the balancer system 8 of the engine E' are identical to those of the engine E shown in FIGS. 1 through 4. In the engine E', the driven gear 50 of the hollow shaft 47 which has the second secondary counterbalance 10 is operatively coupled to a drive gear 85a of a starter motor 85 successively through a starter gear 82, a one-way clutch 83, and a driven gear 84 of an engine starter 81.

More specifically, the starter gear 82 is rotatably mounted on a starter spindle 86 which is rotatably supported in the crankcase 2 and the clutch cover 76, the starter gear 82 being held in mesh with the driven gear 50. The driven gear 84 is mounted on an end of the starter spindle 86 and meshes with the drive gear 85a of the starter motor 85. The starter gear 82 and the driven gear 84 is connected to each other for rotation by the one-way clutch 83, which is disposed between the starter gear 82 and the driven gear 84 concentrically with the starter spindle 86.

Rotative power from the starter motor 86 it transmitted to the crankshaft 1 successively through the drive gear 85a, the driven gear 84, the one-way clutch 83, the starter gear 82, and the drive assembly 48 of the balancer system 8. Therefore, the drive assembly 48 of the balancer system 8 is effectively utilized for starting the engine E'. As a result, the number of dedicated components of the engine starter 81 is reduced. Since the rotative power transmitted from the starter motor 85 to the crankshaft 1 is reduced in speed between the driven gear 50 and the drive gear 49 of the drive assembly 48, the speed reduction ratio between the drive gear 85a of the starter motor 85 and the driven gear 84 may be reduced. It is not necessary to provide an idle gear between the gears 85a, 84 or increase the diameter of the driven gear 84 for a greater speed reduction ratio as is the case wit the conventional engine starter. With the illustrated arrangement, the driven gear 84 may be held in direct mesh with the drive gear 85a or reduced in diameter.

Figure 6:
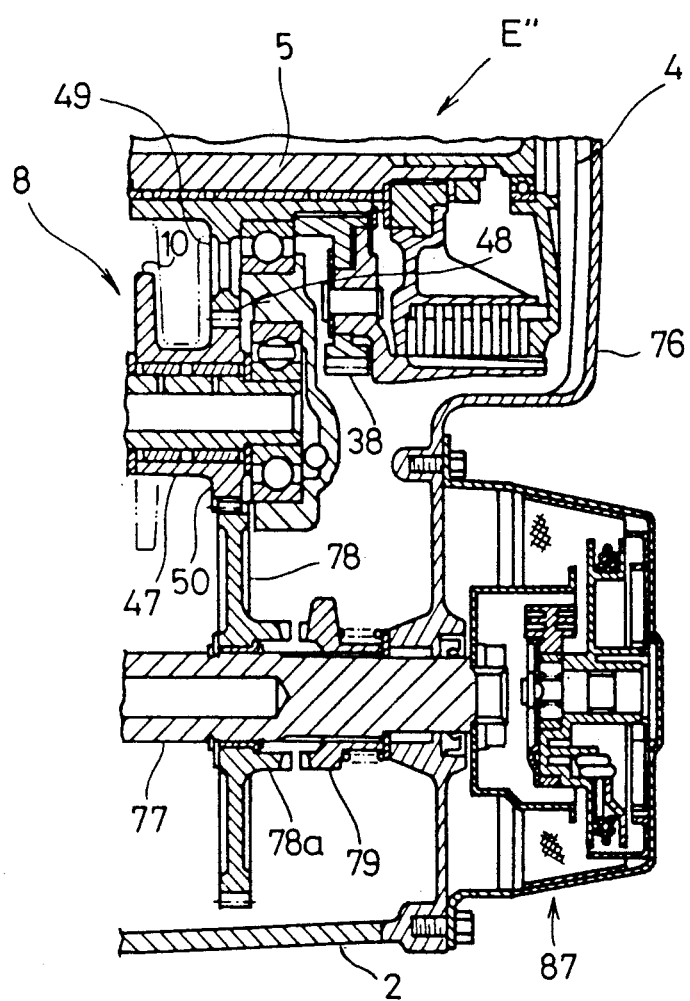
FIG. 6 is a fragmentary cross-sectional view of still another engine incorporating the balancer system according to the present invention.

FIG. 6 shows still another engine which incorporates the balancer system according to the present invention. The engine, denoted at E'', shown in FIG. 6 employs a recoil starter as an engine starter.

Those parts shown in FIG. 6 which are identical to those shown in FIGS. 1 through 4 are denoted by identical reference numerals, and will not be described in detail.

The internal structure of the engine E'' is identical to that of the engine E shown in FIGS. 1 through 4. A recoil starter 87 is mounted on the end of the starter spindle 77 which projects out of the clutch cover 76. When the recoil starter 87 is operated on in the manner as well known in the art, it rotates the crankshaft 1 through the drive assembly 48 of the balancer system 8.

In the engine E'', therefore, the drive assembly 48 of the balancer system 8 is effectively utilized for the starting of the engine E'', as with the engine E.

In the above embodiments, the kick starter 22, the engine starter 81 including the starter motor 85, and the kick starter 87 have been shown and described. However, any of other engine starters may be employed which has a starter gear in mesh with the driven gear 50 of the drive assembly 48 of the balancer system 8, so that the drive assembly 48 may be effectively utilized to get the engine started.

Figure 7:
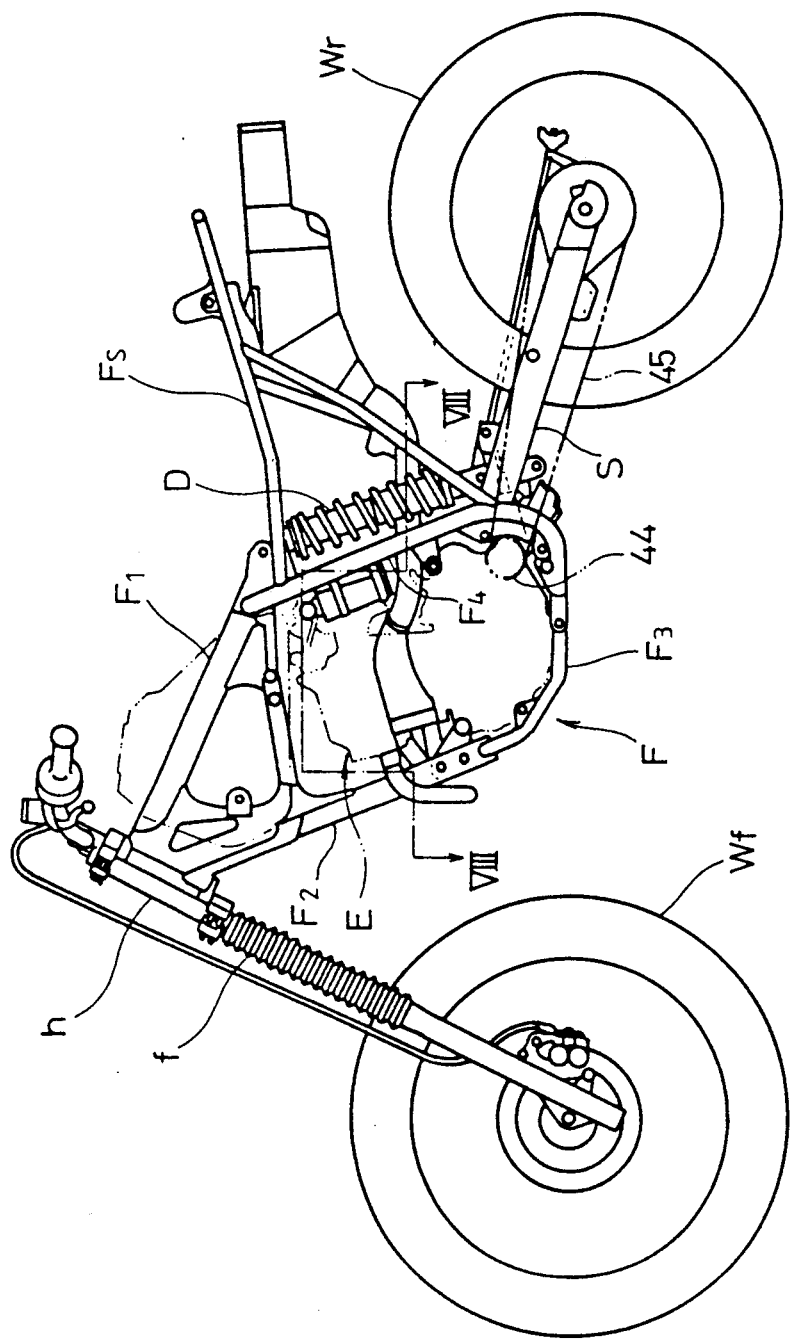
FIG. 7 is a side elevational view of a motorcycle which is equipped with the engine shown in FIG. 1.

A motorcycle on which the engine E is mounted will be described below with reference to FIGS. 1, 7, and 8. FIG. 7 shows the motorcycle in side elevation, and FIG. 8 shows a cross section of the motorcycle taken along line VIII—VIII of FIG. 7.

Figure 8:
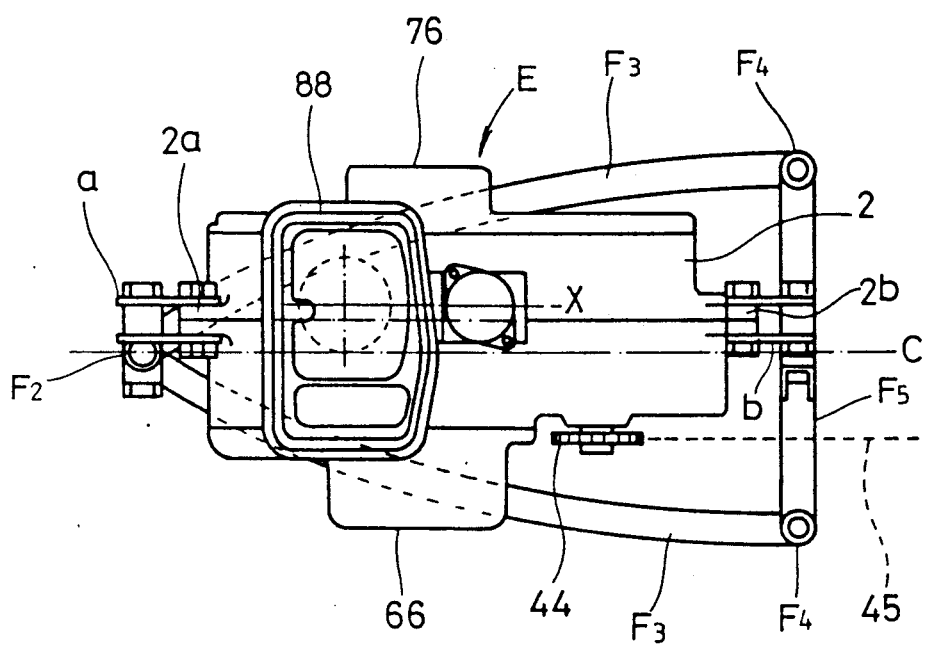
FIG. 8 is a cross-sectional view taken along line VIII—VIII of FIG. 7.

In FIGS. 7 and 8, the motorcycle has a motorcycle frame assembly F on which the engine E is mounted, a front wheel Wf rotatably supported on a head pipe h of the frame assembly F by a front fork f, and a rear wheel Wr rotatably supported on a rear portion of the frame assembly F by a swing arm S and a hydraulic damper D.

As shown in FIG. 7, the frame assembly F comprises an upper frame F1 and a front frame F2 which extend obliquely downwardly from the head pipe h, a V-shaped pair of lower frames F3 (see also FIG. 8) extending rearwardly from the lower end of the front frame F2, a pair of rear frames F4 interconnecting the rear ends of the lower frames F3 and the rear ends of the upper frame F1, and a transverse frame F5 extending between the rear frames F4 in the transverse direction of the motorcycle. A seat frame Fs extends rearwardly from the upper ends of the rear frames F4.

The engine E has its crankshaft 1 directed transversely with respect to the motorcycle, with the generator cover 66 and the clutch cover 76 being positioned on the lateral sides of the frame assembly F. The engine E is supported on the lower frames f3 as shown in FIGS. 7 and 8. As shown in FIG. 8, a pair of engine hangers 2a, 2b integrally formed with the front and rear ends of the crankcase 2 are fixed to the front frame F2 and the transverse frame F5, respectively, through respective attachments a, b. As shown in FIG. 7, the drive sprocket 44 fitted over the countershaft 7 is operatively coupled to the rear wheel Wr through the endless chain 45 which extends longitudinally with (FIG. 8) of the motorcycle extends parallel to the central plane X (FIGS. 1 and 8) containing the axis of the piston 14 and is positioned substantially intermediate between the central plane X and the camshaft drive mechanism which is composed of the cam driven gear 73, the cam drive gear 74, and the chain 75. Such a disposition can be achieved by suitably positioning the rear wheel Wr and the drive sprocket 44 with respect to each other.

Therefore, as shown in FIG. 1, the piston 14 and the clutch 4 are positioned on the righthand side of the central line C, and the generator 21 and the camshaft drive mechanism are positioned on the righthand side of the central line C, with the generator 21, the camshaft drive mechanism, the piston 14, and the clutch 4 being successively arranged at substantially equal intervals in the axial direction of the crankshaft 1 from a position near one end of the crankshaft 1 toward a position near the other end thereof. Accordingly, the generator 21 and the clutch 4 are spaced from the central line C by substantially equal distances. As illustrated n FIGS. 1 and 8, the engine E projects laterally from the central line C by greatest distances at the generator cover 66 of the generator 21 and the clutch cover 76 of the clutch 4. Since the distances of the generator 21 and the clutch 4 from the central line C are substantially the same as each other, the generator cover 66 and the clutch cover 76 project laterally from the central line C by substantially the same distances.

Inasmuch a the engine E projects laterally from the central line C by substantially the same distances, as described above, the rider can ride on the motorcycle in a posture suitable for driving with his legs supported in a suitable position. If a fairing (not shown) is installed on the motorcycle, any appreciable idle space is not created between the fairing and the engine E, and the fairing may be positioned closely to the lateral side surfaces of the engine E. As a consequence, the lateral dimension of the motorcycle is not overly increased by the fairing.

As shown in FIG. 8, the engine hangers 2a, 2b are fastened to the front frame F2 and the transverse frame F5 such that the axis of the piston 14, which is the central source of vibrations of the engine E, is transversely spaced from the central line C, and the engine hangers 2a, 2b are positioned between the axis of the piston 14 and the central line C. Therefore, vibrations of the engine E, which come from the central source or the piston 14, are not directly transmitted to the position of the frame assembly F on the central line C. Thus, any vibrations of the frame assembly F which are caused by the vibrations of the engine E are reduced, giving the rider better riding comfort.

As shown in FIG. 1, the engine E has heat radiation fins 88 on the outer peripheral surfaces of the cylinder block 15 and the cylinder head 17. The fins 88 project to a greater extent on the side of the generator 21 and to a smaller extent on the side of the clutch 4, so that the cylinder block 15 and the cylinder head 17 project laterally from the central line C by substantially equal distances, as shown in FIG. 8.

Although a certain preferred embodiment has been shown and described, it should be understood that many changes and modifications may be made therein without departing from the scope of the appended claims.

What is claimed is:

1. A balancer system in an internal combustion engine which comprises a crankcase, a crankshaft rotatably supported in said crankcase, a clutch, and a transmission including a main shaft extending parallel to the crankshaft and operatively coupled to said crankshaft through said clutch, a transmission gear train, and a countershaft operatively coupled to said main shaft through said transmission gear train, said balancer ,system comprising:

a pair of balancer shafts, one of which is the main shaft; and a pair of first and second primary counterbalances supported on said balancer shafts with the first counterbalance on said main shaft, respectively for rotation about axes parallel to said crankshaft in ganged relation to said crankshaft at the same speed as and in the opposite direction to said crankshaft;

said balancer shafts lying parallel to said crankshaft and being positioned one on each side of the crankshaft, said first and second primary counterbalances being rotatable about respective centers which are connected by a line passing through a substantially central portion of said crankshaft, said first and second primary counterbalances being rotatably supported on said balancer shafts near ends thereof, with said centers being spaced from the central portion of said crankshaft by substantially equal distances.

2. A balancer system according to claim 1, wherein said clutch has a clutch outer rotatably mounted on said main shaft, further including a primary drive gear mounted on said crankshaft and a primary driven gear rotatably mounted on said main shaft for rotation with said clutch outer, said primary drive and driven gears being held in mesh with each other at a gear ratio of 1:1, and a hollow shaft rotatably mounted on said main shaft, said first primary counterbalance being disposed on said hollow shaft and coupled to said primary driven gear.

3. A balancer system according to claim 2, wherein said hollow shaft has an outer peripheral surface rotatably supported in said crankcase through a bearing, said first primary counterbalance and said primary driven gear being positioned closely one on each side of said bearing.

4. A balancer system according to claim 1, wherein the other of said balancer shafts is rotatably supported with respect to said crankcase parallel to said crankshaft, said second primary counterbalance being disposed on said other balancer shaft, further including a primary drive gear mounted on said crankshaft and a driven gear mounted on said other balancer shaft, said primary drive gear and said driven gear being held in mesh with each other at a gear ratio of 1:1.

5. A balancer system in an internal combustion engine which comprises a crankcase, a crankshaft rotatably supported in said crankcase, a clutch, and a transmission including a main shaft extending parallel to the crankshaft and operatively coupled to said crankshaft through said clutch, a transmission gear train, and a countershaft operatively coupled to said main shaft through said transmission gear train, said balancer system comprising:
 a pair of balancer shafts; and
 a pair of first and second primary counterbalances supported on said balancer shafts, respectively, for rotation about axes parallel to said crankshaft in ganged relation to said crankshaft at the same speed as and in the opposite direction to said crankshaft;
 one of said balancer shafts comprising said main shaft of the transmission, said first primary counterbalance being rotatably supported on one end of said main shaft.

6. A balancer system according to claim 5, wherein said clutch has a clutch outer rotatably mounted on said main shaft, further including a primary drive gear mounted on said crankshaft and a primary driven gear rotatably mounted on said main shaft for rotation with said clutch outer, said primary drive and driven gears being held in mesh with each other at a gear ratio of 1:1, and a hollow shaft rotatably mounted on said main shaft, said first primary counterbalance being disposed on said hollow shaft and coupled to said primary driven gear.

7. A balancer system according to claim 6, wherein said hollow shaft has an outer peripheral surface rotatably supported in said crankcase through a bearing, said first primary counterbalance and said primary driven gear being positioned closely one on each side of said bearing.

8. A balancer system according to claim 5, wherein the other of said balancer shafts is rotatably supported with respect to said crankcase parallel to said crankshaft, said second primary counterbalance being disposed on said other balancer shaft, further including a primary drive gear mounted on said crankshaft and a driven gear mounted on said other balancer shaft, said primary drive gear and said driven gear being held in mesh with each other at a gear ratio of 1:1.

9. A balancer system in an internal combustion engine which comprises a crankcase, a crankshaft rotatably supported in said crankcase, a clutch, and a transmission including a main shaft extending parallel to the crankshaft and operatively coupled to said crankshaft through said clutch, a transmission gear train, and a countershaft operatively coupled to said main shaft through said transmission gear train, said balancer system comprising:
 a pair of balancer shafts; and
 a pair of first and second counterbalances supported on said balancer shafts, respectively, for rotation about axes parallel to said crankshaft in ganged relation to said crankshaft at a speed twice the speed of the crankshaft and in mutually opposite directions;
 said counterbalances being disposed closely to a plane which passes near a substantially central portion of the crankshaft in the crankcase and extends perpendicularly to said crankshaft.

10. A balancer system according to claim 9, wherein one of said balancer shafts comprises said countershaft of the transmission, said first counterbalance being rotatably supported on said countershaft.

11. A balancer system according to claim 10, wherein said clutch has a clutch outer rotatably mounted on said main shaft of the transmission for rotation in ganged relation to said crankshaft, further including a drive gear rotatably mounted on said main shaft for rotation with said clutch outer and a driven gear rotatably mounted on said countershaft for rotation with said first counterbalance, said drive and driven gears being held in mesh with each other for rotating said first counterbalance at the speed twice the speed of said crankshaft.

12. A balancer system according to claim 11, further including a hollow shaft rotatably mounted concentrically on the countershaft of said transmission, said first counterbalance and said driven gear being integrally disposed on said hollow shaft.

13. A balancer system according to claim 11, wherein said internal combustion engine has an engine starter having a starter gear for rotating said crankshaft to start the internal combustion engine, said driven gear being held in mesh with said starter gear.

14. A balancer system according to claim 10, wherein the other of said balancer shafts extends parallel to said crankshaft with the crankshaft positioned between said main shaft and said other balancer shaft, said second counterbalance being rotatably supported on said other balancer shaft, further including a drive gear on an outer peripheral surface of a crank web of said crankshaft, and a driven gear rotatably mounted on said other balancer shaft for rotation with said second counterbalance, said drive gear and said driven gear being held in mesh with each other at a gear ratio of 2:1.

15. A balancer system in an internal combustion engine which comprises a crankcase, a crankshaft rotatably supported in said crankcase, a clutch, and a transmission including a main shaft extending parallel to the crankshaft and operatively coupled to said crankshaft through said clutch, a transmission gear train, and a countershaft operatively coupled to said main shaft through said transmission gear train, said balancer system comprising:
 a pair of balancer shafts; and
 a pair of first and second counterbalances supported on said balancer shafts, respectively, for rotation about axes parallel to said crankshaft in ganged relation to said crankshaft at a speed twice the speed of the crankshaft and in mutually opposite directions;
 one of said balancer shafts comprising said countershaft of the transmission, said first counterbalance being rotatably supported on said countershaft..

16. A balancer system according to claim 15, wherein said clutch has a clutch outer rotatably mounted on said main shaft of the transmission for rotation in ganged relation to said crankshaft, further including a drive gear rotatably mounted on said main shaft for rotation with said clutch outer and a driven gear rotatably mounted on said countershaft for rotation with said first counterbalance, said drive and driven gears being held in mesh with each other for rotating said first counterbalance at the speed twice the speed of said crankshaft.

17. A balancer system according to claim 16, further including a hollow shaft rotatably mounted concentrically on the countershaft of said transmission, said first counterbalance and said driven gear being integrally disposed on said hollow shaft.

18. A balancer system according to claim 16, wherein said internal combustion engine has an engine starter having a starter gear for rotating said crankshaft to start the internal combustion engine, said driven gear being held in mesh with said starter gear.

19. A balancer system according to claim 15, wherein the other of said balancer shafts extends parallel to said crankshaft with the crankshaft positioned between said main shaft and said other balancer shaft, said second counterbalance being rotatably supported on said other balancer shaft, further including a drive gear on an outer peripheral surface of a crank web of said crankshaft, and a driven gear rotatably mounted on said other balancer shaft for rotation with said second counterbalance, said drive gear and said driven gear being held in mesh with each other at a gear ratio of 2:1.

20. A balancer system in an internal combustion engine which comprises a crankcase, a crankshaft rotatably supported in said crankcase, a clutch, and a transmission including a main shaft extending parallel to the crankshaft and operatively coupled to said crankshaft through said clutch, a transmission gear train, and a countershaft operatively coupled to said main shaft through said transmission gear train, said balancer system comprising:
a plurality of balancer shafts;
a pair of first and second primary counterbalances supported on two of said balancer shafts, respectively, for rotation about axes parallel to said crankshaft in ganged relation to said crankshaft at the same speed as and in the opposite direction to said crankshaft; and
a pair of first and second secondary counterbalances supported on two of said balancer shafts, respectively, for rotation about axes parallel to said crankshaft in ganged relation to said crankshaft at a speed twice the speed of the crankshaft and in mutually opposite directions;
the balancer shafts which support said first primary counterbalance and said first secondary counterbalance comprising said main shaft and said countershaft of the transmission, said first primary counterbalance being rotatably supported on said main shaft, and said first secondary counterbalance being rotatably supported on said countershaft.

21. A balancer system according to claim 20, further comprising drive means for rotating said first secondary counterbalance at the speed twice the speed of said crankshaft in ganged relation to said first primary counterbalance, said first primary counterbalance and said first secondary counterbalance being operatively connected to each other through said drive means.

22. A balancer system according to claim 21, wherein said drive means comprises a drive gear rotatably mounted on said main shaft for rotation with said first primary counterbalance, and a driven gear rotatably mounted on said countershaft for rotation with said first secondary counterbalance, said drive and driven gears being held in mesh with each other at a gear ratio of 2:1, said first primary counterbalance being rotatably mounted on said main shaft in a position between said first secondary counterbalance and said driven gear.

23. A balancer system according to claim 22, further including a first hollow shaft rotatably mounted concentrically on the main shaft of said transmission, said first primary counterbalance and said drive gear being integrally disposed on said first hollow shaft, and a second hollow shaft rotatably mounted concentrically on the countershaft of said transmission, said first secondary counterbalance and said driven gear being integrally disposed on said hollow shaft.

24. A balancer system according to claim 23, wherein said clutch has a clutch outer rotatably mounted on said main shaft of the transmission, further including a primary drive gear rotatably mounted on said crankshaft and a primary driven gear rotatably mounted on said main shaft for rotation with said clutch outer, said primary drive and driven gears being held in mesh with each other at a gear ratio of 1:1, said first primary counterbalance being coupled to said primary driven gear through said first hollow shaft.

25. A balancer system according to claim 22, wherein said internal combustion engine comprises a single-cylinder engine, said crankshaft comprises a pair of crank webs disposed in said crankcase, a first crankshaft member having a crankpin integral with one of said crank webs and interconnecting said crank webs to each other, and a second crankshaft member having the other of said crank webs, said one of the crank webs having a thin portion integral with said crankpin, defining a gap between said one crank web and an inner wall of said crankcase, said drive gear being rotatable about said main shaft in said gap when said crankshaft rotates.

26. A balancer system according to claim 20, wherein the balancer shaft which supports said second primary counterbalance is rotatably supported in said crankcase parallel to said crankshaft, said second primary counterbalance being disposed on said last-mentioned balancer shaft, said second secondary counterbalance being rotatably supported on said last-mentioned balancer shaft.

27. A balancer system according to claim 26, wherein the balancer shaft which supports said second primary counterbalance extends parallel to said crankshaft with the crankshaft positioned between said last-mentioned balancer shaft and said main shaft, said first and second primary counterbalances being positioned one on each side of a plane which passes a central portion of said crankshaft in the crankcase and extends perpendicularly to said crankshaft, and being positioned respectively near outer portions of said main shaft and said last-mentioned balancer shaft in axial directions thereof, said first and second secondary counterbalances being positioned respectively near inner portions of said countershaft and said last-mentioned balancer shaft in axial directions thereof.

* * * * *